United States Patent [19]

Lowe

[11] 4,293,004

[45] Oct. 6, 1981

[54] ELECTRONIC VALVE ASSEMBLY FOR GLASSWARE FORMING MACHINERY

[75] Inventor: Earl L. Lowe, Winchester, Ind.

[73] Assignee: Ball Corporation, Muncie, Ind.

[21] Appl. No.: 68,276

[22] Filed: Aug. 20, 1979

Related U.S. Application Data

[63] Continuation-in-part of Ser. No. 12,862, Feb. 16, 1979.

[51] Int. Cl.³ .............................................. F15B 13/08
[52] U.S. Cl. .............................. 137/884; 137/596.16; 137/885
[58] Field of Search ...................... 137/596.16, 884, 885

[56] References Cited

U.S. PATENT DOCUMENTS

| | | | |
|---|---|---|---|
| 3,918,489 | 11/1975 | Foster et al. | 137/596.16 |
| 4,082,108 | 4/1978 | Dininio | 137/884 X |
| 4,162,910 | 7/1979 | Lining et al. | 65/163 |

OTHER PUBLICATIONS

Maul Brothers, Inc. brochure.

*Primary Examiner*—Gerald A. Michalsky
*Attorney, Agent, or Firm*—Cushman, Darby & Cushman

[57] ABSTRACT

An electronic valve block assembly for controlling the operation of glassware forming machinery. A selector mechanism is utilized to couple either a high pressure plenum or a low pressure plenum to the input port of a solenoid operated valve. A pressure regulator is interjected between the selector mechanism and the valve to finely control the pressure, providing ample flow of output air over a wide range of pressures. A preferred embodiment of pressure regulator is described. Also described is an adapter plate for making the valve block compatible with varying IS machine manifold configurations.

32 Claims, 20 Drawing Figures

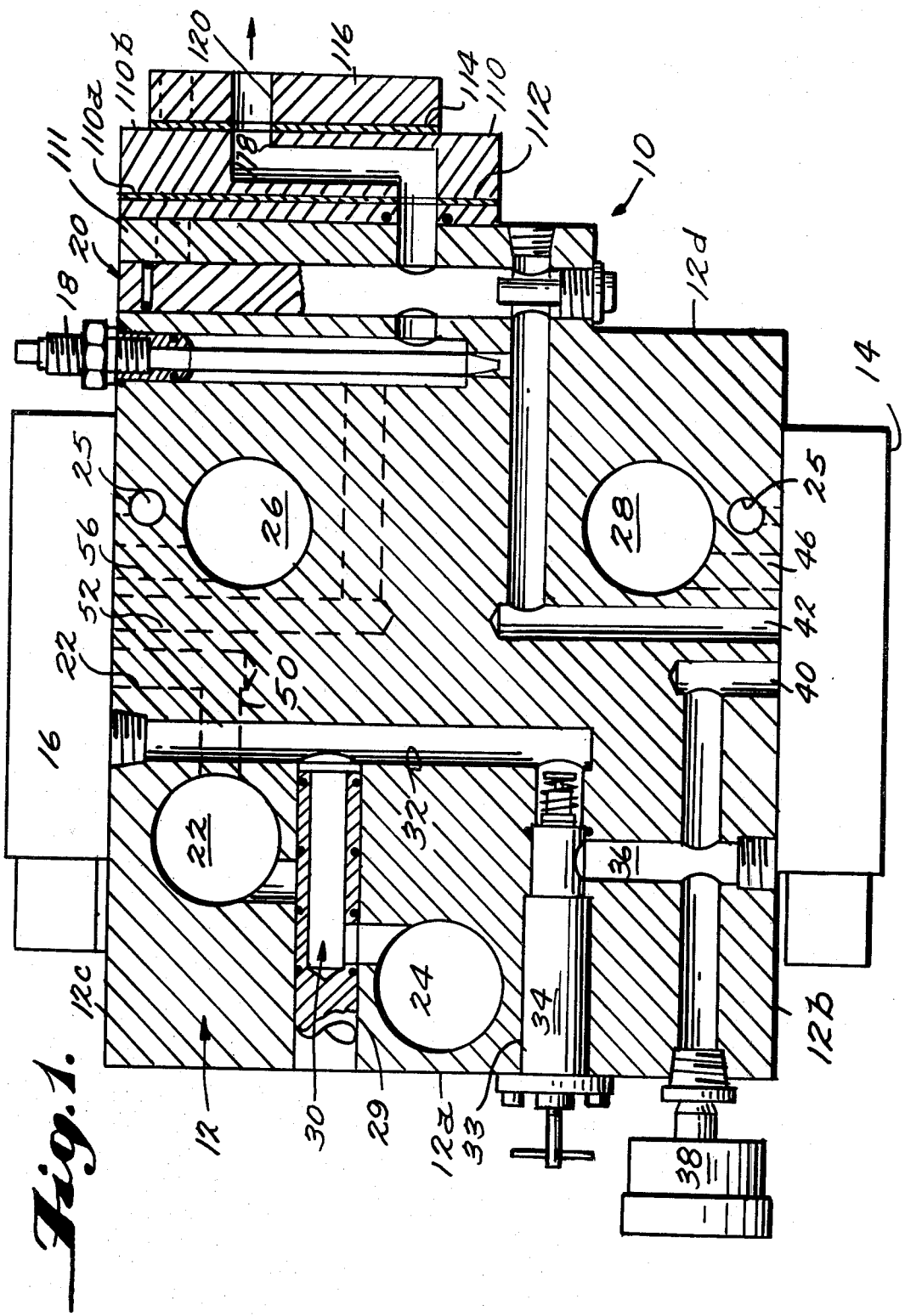

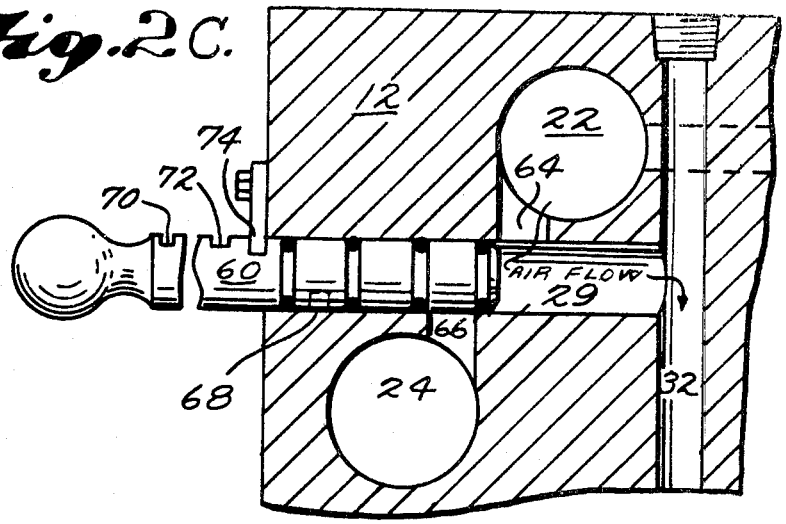
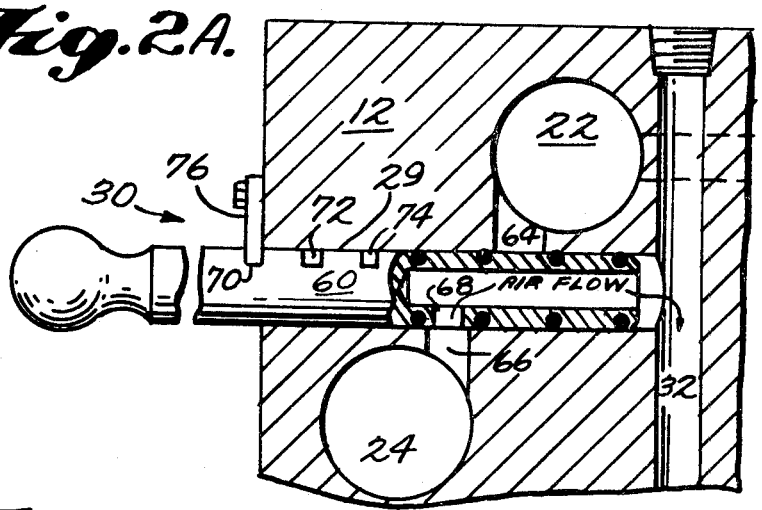
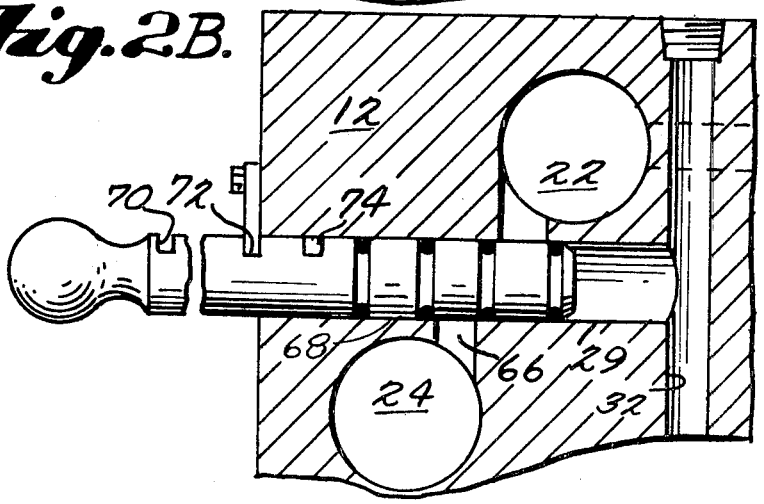

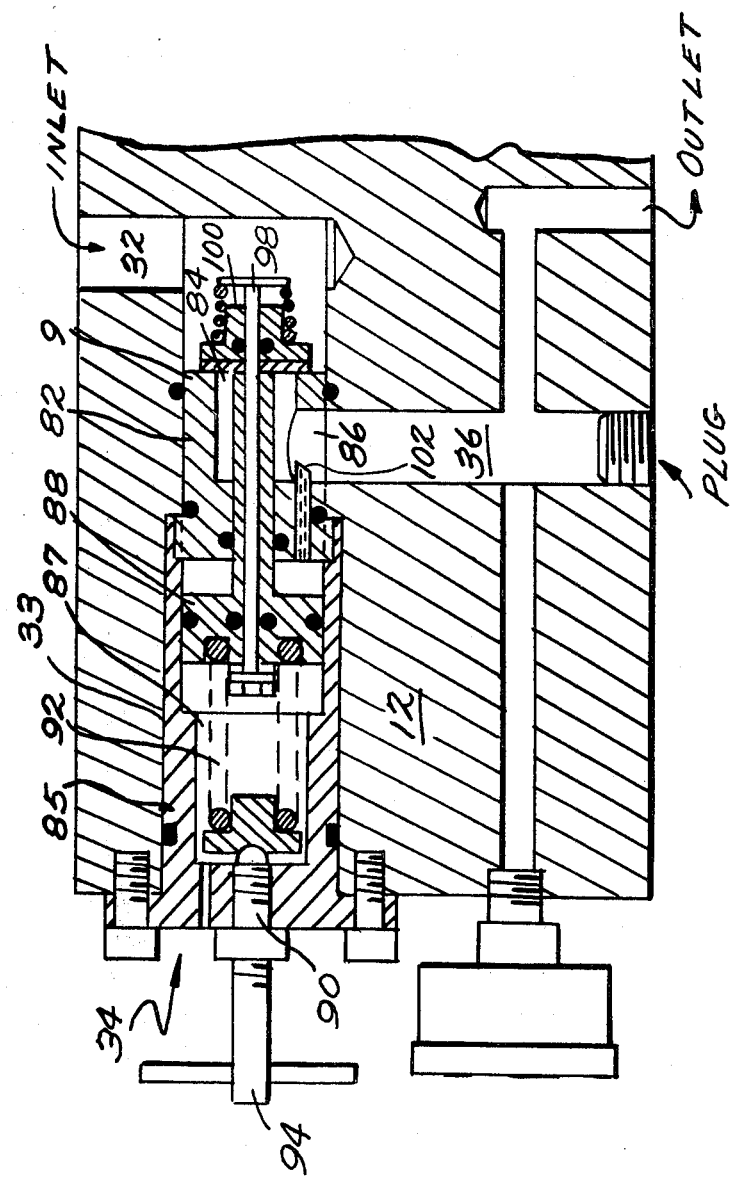

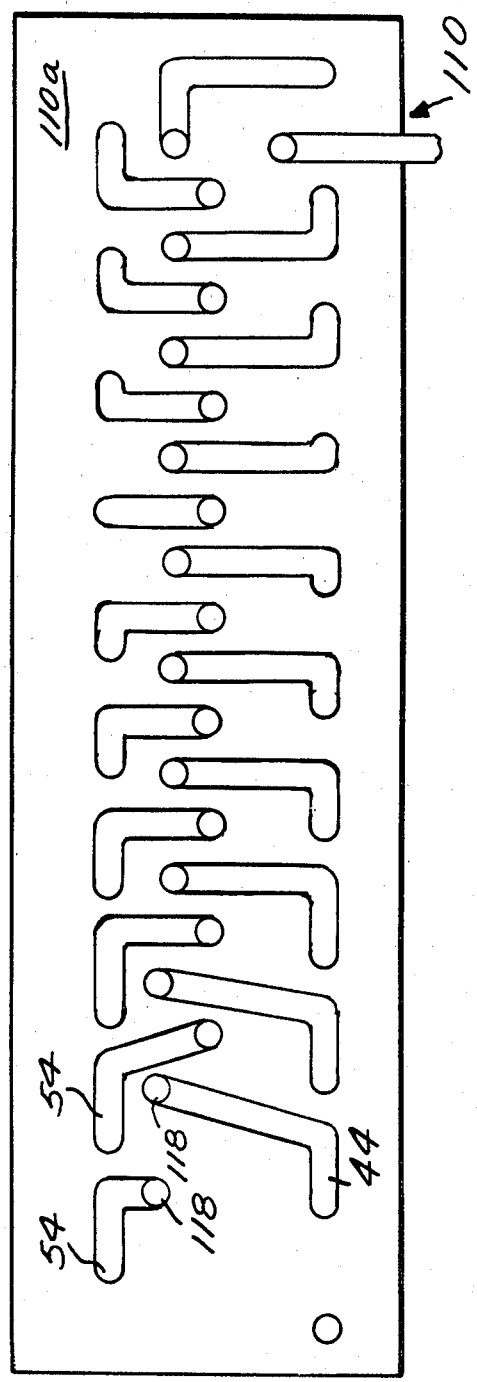

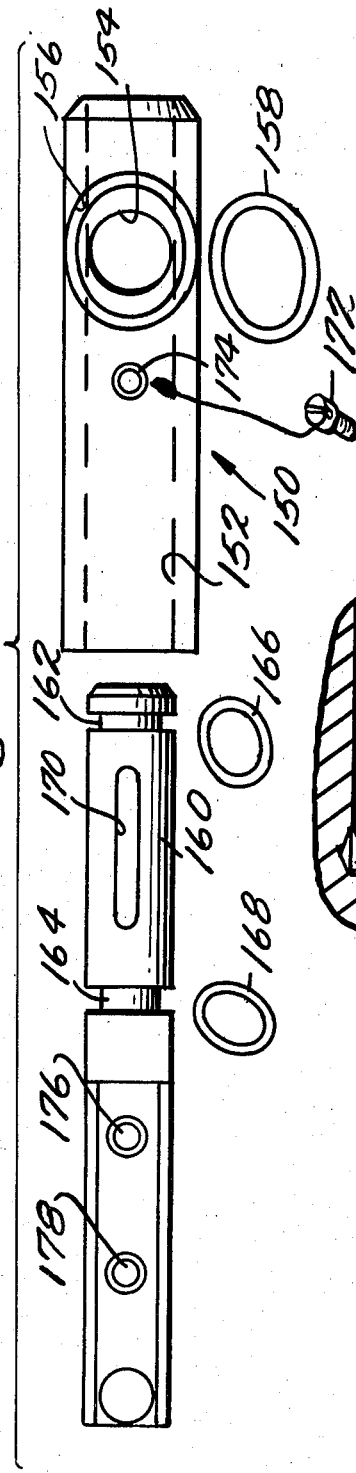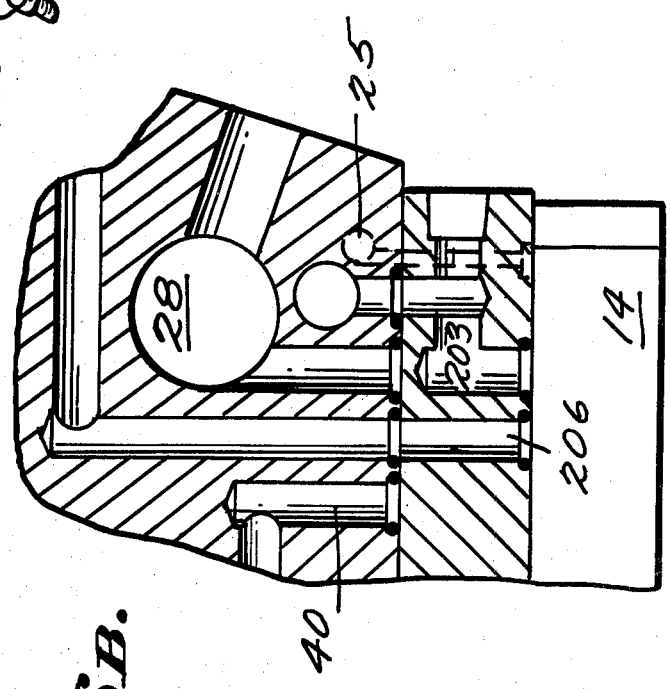

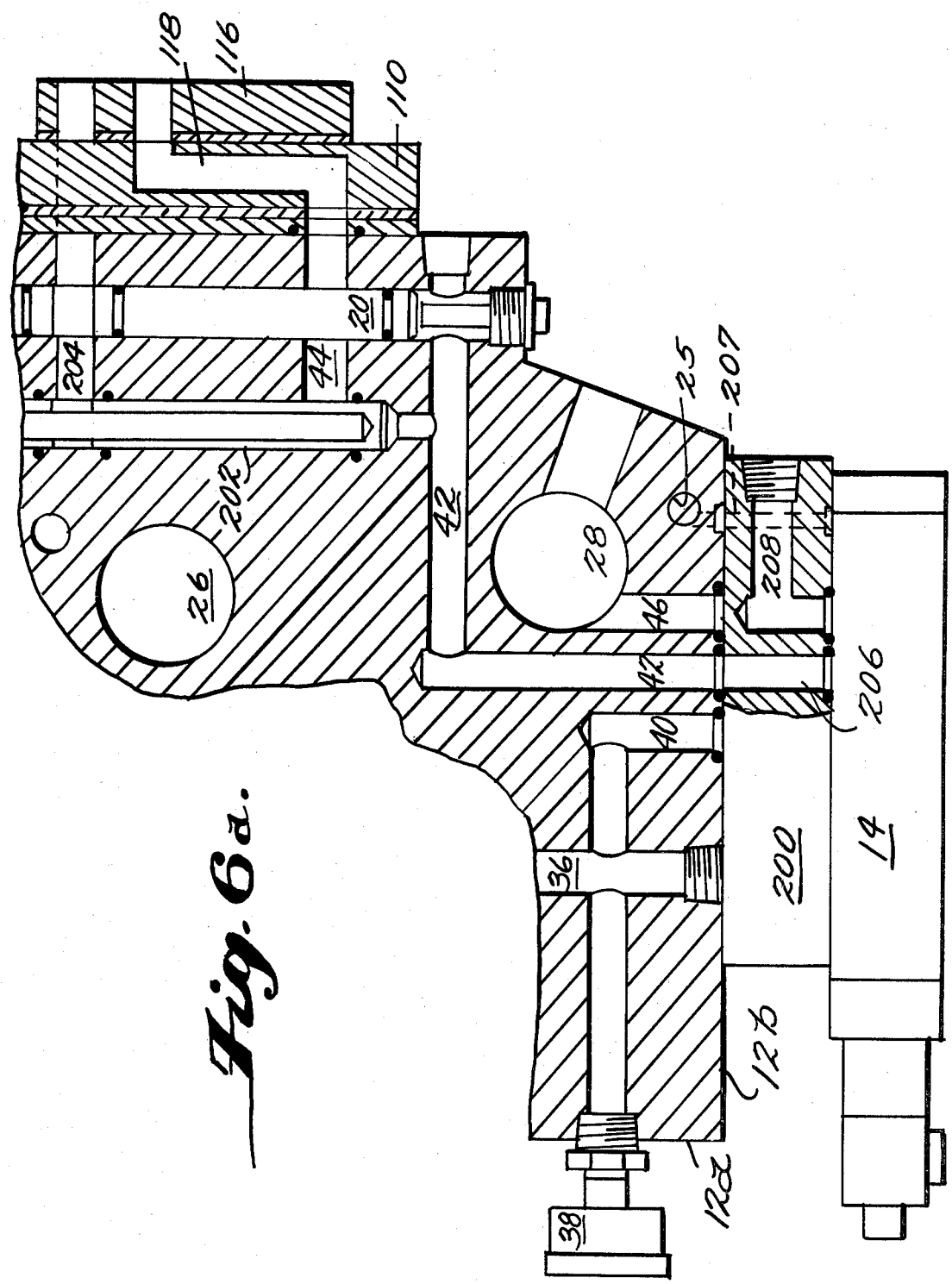

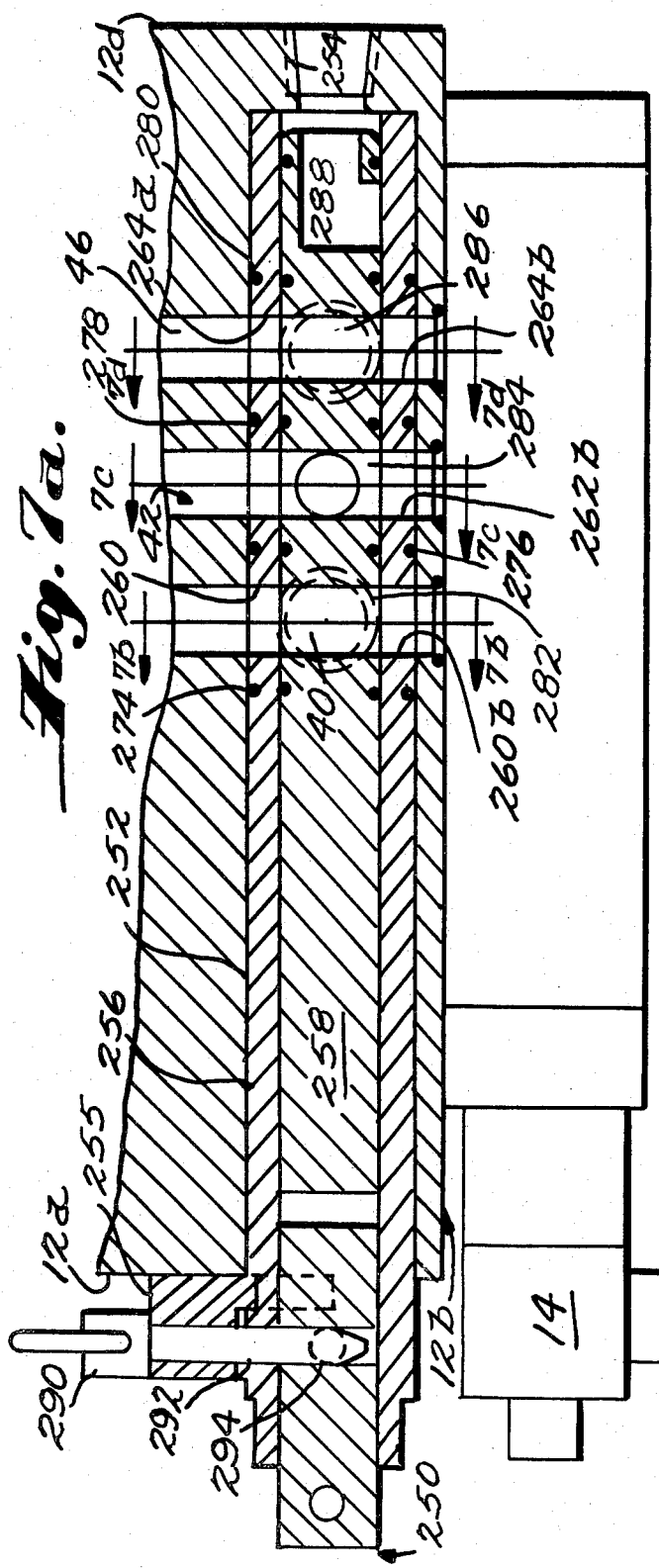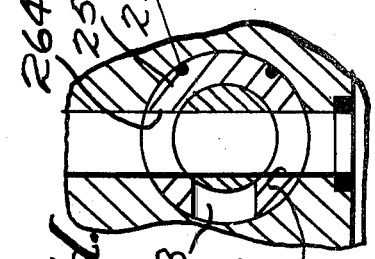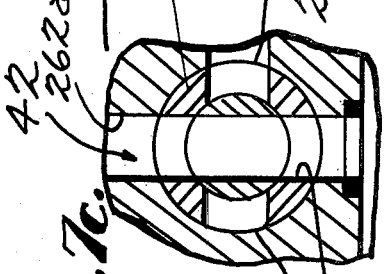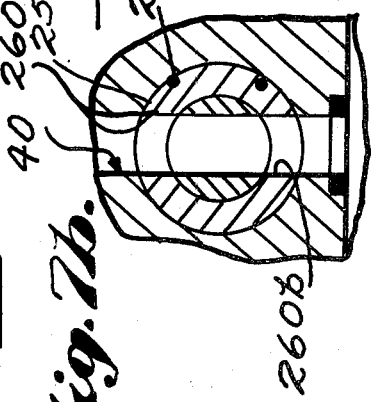

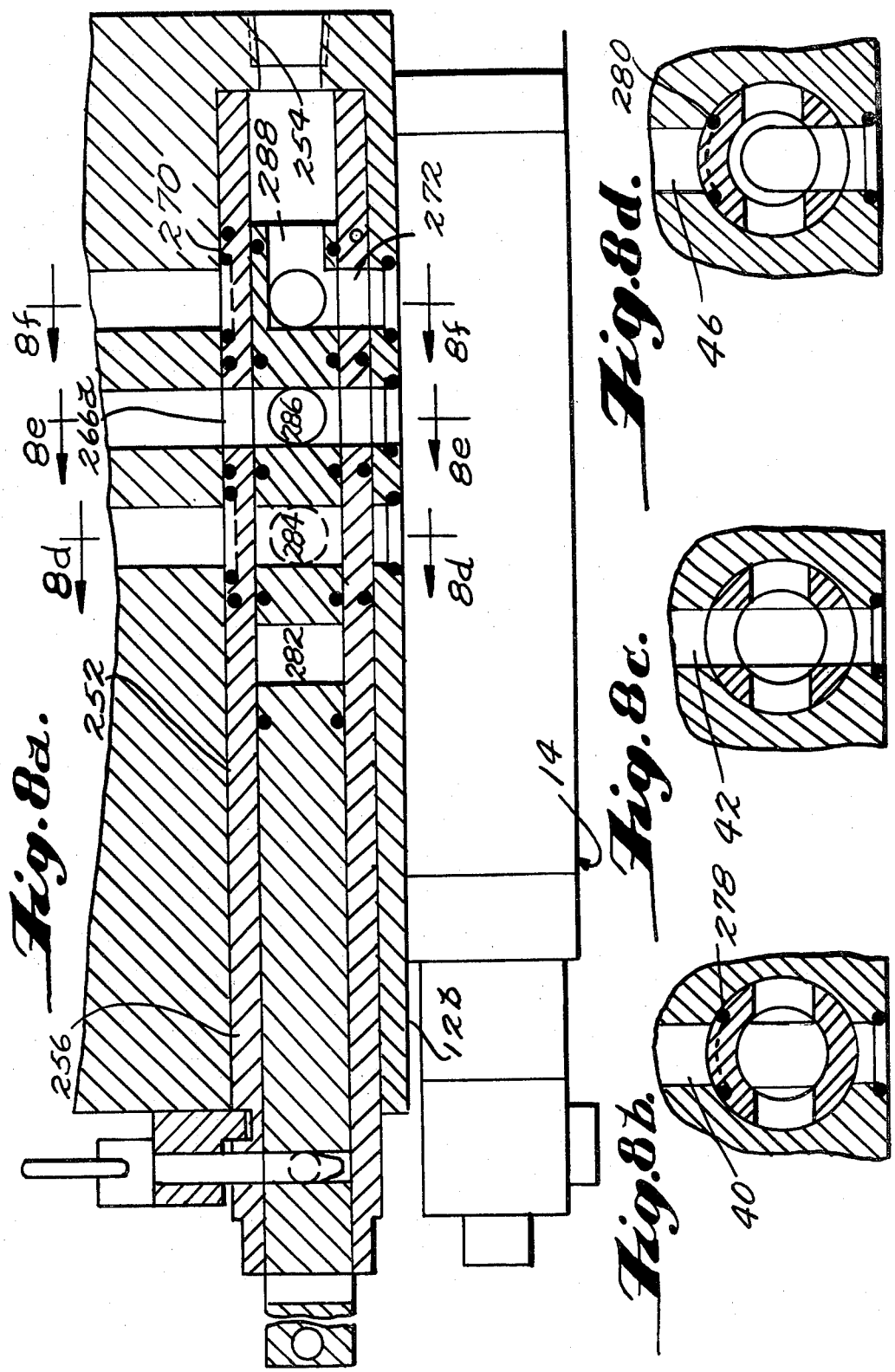

ELECTRONIC VALVE ASSEMBLY FOR GLASSWARE FORMING MACHINERY

The present application is a continuation-in-part application of copending application Ser. No. 12,862 entitled ELECTRONIC VALVE ASSEMBLY FOR GLASSWARE FORMING MACHINERY filed by Earl Leroy Lowe on Feb. 16, 1979.

BACKGROUND OF THE INVENTION

The present invention relates to valve assemblies and, in particular, to an electronic valve block assembly for controlling the operation of glassware forming machinery.

Glassware forming machines typically comprise a plurality of individual sections (IS) cooperating to receive, in ordered sequence, gobs of molten glass from a single source. Each individual section (IS) of the glassware forming machine itself includes a plurality of pneumatically operated elements. The relative operating sequence of the respective elements of each IS machine is controlled through selective actuation of an associated valve typically disposed in a valve block. There are typically 19 or 21 separate valves utilized in the control of the complete glassware forming sequence.

The actuation of the valves in the block has typically been effected by a mechanical timing drum driven in synchronism with the gob feeding mechanism. Respective projecting cam members are disposed in annular grooves in the drum surface and mechanically cooperate with the valves to effect activation and deactivation. Relative timing between events in the machine cycle are adjusted by the relative position of the respective cam members in the annular grooves. For a basic description of such a glassware forming machine, reference is made to U.S. Pat. No. 1,911,119 issued May 23, 1933 to H. W. Ingle.

Electronic sequencing of the respective elements of the glassware forming machine is now emerging. For a description of electronically controlled glassware forming machinery, reference is made to U.S. Pat. No. 3,762,907 issued Oct. 2, 1973 to Quinn and Kwaitkowski and U.S. Pat. No. Re 29,642, reissued May 23, 1978 to Kwaitkowski and Wood (both commonly assigned with the present application). Briefly, in electronically controlled glassware forming machines, actuation signals are generated by an electronic controller to selectively actuate or deactivate solenoid operated valves, or the like, to effect timed operation of the respective glassware forming machine elements. The actuation signals are generated in synchronism with the machine cycle as defined by the molten glass gob feeder.

Typical solenoid controlled valve blocks are described in U.S. Pat. No. 3,918,489 issued Nov. 11, 1975 to Foster et al and U.S. Pat. No. 3,982,726 issued Sept. 28, 1976 to Bublitz et al. It is noted that in electronic valve blocks, the space required by the valves within the valve block must be minimized in order to incorporate all of the 19 or more pneumatic valves into the valve block.

In addition, the compactness requisites for the valve block are magnified by a need for plural air pressures for operation of the IS machine in various modes. Conventional electronic valve blocks have required external plumbing to provide the various air pressures as required. Accordingly, when the machine is converted for production of different types of bottles, (i.e., job change) replumbing of the machine is often required. Job changes on IS machines can occur as frequently as on a less than weekly basis. As can readily be appreciated, the replumbing of the machine can be very costly in terms of production downtime.

Mitigating against the need for compact valves is the necessity of ample air flow to maintain the operational speeds of the IS elements. Also, mitigating against compact valves is the desirability to be able to operate the IS machine functions with unfiltered air. In the typical operation of the IS machine, various condensations, cylinder oil, sludge and varnish from the compressor, and the like, tend to find its way into the air lines. The foreign materials often play havoc with close tolerance orifices in the valves. As can readily be appreciated, installation of additional filtering apparatus, and frequent cleaning or change of the filters entails substantial costs.

Similarly, it is often desirable to have vacuum (reverse pressure) available for various machine functions. For example, a vacuum is often utilized to "assist" in settling a gob of molten glass in the finish portion (threaded portion or neck) of a mold during the formation process. Vacuum is generally provided through massive hard-plumbed piping, and manifolds located under the IS machine in the so-called "bed level".

In general, two-tiers of valves are utilized to provide control of application of vacuum. Solenoid operated pilot valves, under the auspices of the controller, selectively provide pilot air to pilot operated spring return power valves generally located in the bed level piping under the machine. The power valves, in turn, provide "blank-side" vacuum to the bottle finish area. Thus, vacuum is only indirectly controlled by the solenoid valves.

The two-tiered control system and disposition of the vacuum lines and power valves in the bed level cause serious problems in providing controlled vacuum assist to the IS. The environment in the bed level of the IS machine is particularly harsh, causing frequent failure of the power valves. Moreover, the power valves in the bed level are relatively inaccessible.

A still more serious problem arises from the delay time and inconsistent operation inherent in the two-tier system due to the relatively long lengths of piping used. The disposition of the vacuum line and power valve in the bed level necessitates piping from the bed level to the blank-side bottle finish apparatus. The piping between the finish apparatus must be evacuated before vacuum is established in the finish area. Thus, a delay, which varies depending on the amount of time required to evacuate the piping is interjected into the system. The time required to evacuate the piping often in itself, varies due to power fluctuations, foreign matter in the lines, or other substantially uncontrollable factors. An additional delay is entailed in supplying the pilot air from the solenoid valve to the power valve.

It should be appreciated that accurate timing of the vacuum to the finish area of the bottle is critical to the effectiveness of the vacuum assist.

An additional problem has arisen with the conventional electronic valve block in that the malfunction of a single valve can often necessitate the removal of the entire valve block to effect repairs requiring the IS machine to shut down for lengthy periods.

In addition, the conventional electronic valve block provides the actuating air at output ports which must mate with a manifold (kissplate) to the glassware forming machine. However, the spatial configuration of the manifold inputs vary on the various types and models of glassware forming machines. Accordingly, special plumbing must be provided to couple the output ports of the conventional electronic valve block to the manifold of different IS machines.

SUMMARY OF THE INVENTION

The present invention provides an electronic valve block of compact structure permitting disposition of 19 or more valves for complete control of the IS machine operation. A plurality of solenoid air pilot operated valves are each formed as respective units and are removably attached to the block body to provide for ready access to the individual valves without necessity of disassembling or removing the valve block.

Plural operating pressures are provided through use of selector mechanisms incorporated into the valve block. Separate plenum chambers adapted for communication with high and low pressure sources, respectively, are included in the valve block. The selector mechanism selectively couples one of the plenums to the input port of an associated solenoid operated valve. The selector mechanism can also cut off all air flow to the valve. Ample air flow over wide ranges of pressures can be provided by further incorporation of a pressure regulator cooperating with the selector mechanism. In accordance with one aspect of the invention, a pressure regulator is utilized which provides high flow capacity, is relatively tolerant of air contaminants and not susceptible to clogging, while at the same time requires a minimum of space within the valve block.

In addition, the valve block includes provisions to selectively supply vacuum directly from the valve block. Control of the vacuum is provided by a single solenoid operated valve on the valve block, and piping to the IS apparatus using the vacuum is minimized.

An inexpensive adapter plate is utilized for providing a match to the machine manifold of various types of models of IS machines. Holes are bored through the plate at positions corresponding to the inlet ports of the IS machine manifold kissplate. Air channels are formed in one surface of the plate to provide communication between the holes and the appropriate valve block outlet ports.

In one embodiment of the present invention, such an inexpensive adapter plate is also utilized to provide for selecting the function of a given valve, i.e., whether the valve, when actuated, will provide positive pressure air or will provide vacuum.

BRIEF DESCRIPTION OF THE DRAWING

A preferred exemplary embodiment of the present invention will hereinafter be disclosed in conjunction with the appended drawings wherein like numerals denote like elements and:

FIG. 1 is a cross-sectional view of an exemplary embodiment of a valve block in accordance with the present invention;

FIGS. 2a, 2b and 2c are cross-sectional illustrations of various states of the selector mechanism shown in FIG. 1;

FIG. 3 is a cross-sectional view of a preferred exemplary embodiment of a pressure regulator in accordance with another aspect of the present invention;

FIG. 4 is a front planar view of an adapter plate in accordance with another aspect of the present invention;

FIG. 5d is an exploded illustration of the alternative selector mechanism of FIGS. 5a, 5b and 5c;

FIGS. 6a and 6b are cross-sectoional views of the valve block of FIG. 1 adapted for providing a vacuum; and FIGS. 7a, 7b, 7c, 7d and 8a, 8b, 8c and 8d are cross-sectional views of an air-vacuum selector mechanism.

DETAILED DESCRIPTION OF THE PREFERRED EXEMPLARY EMBODIMENT

Figure 5A:
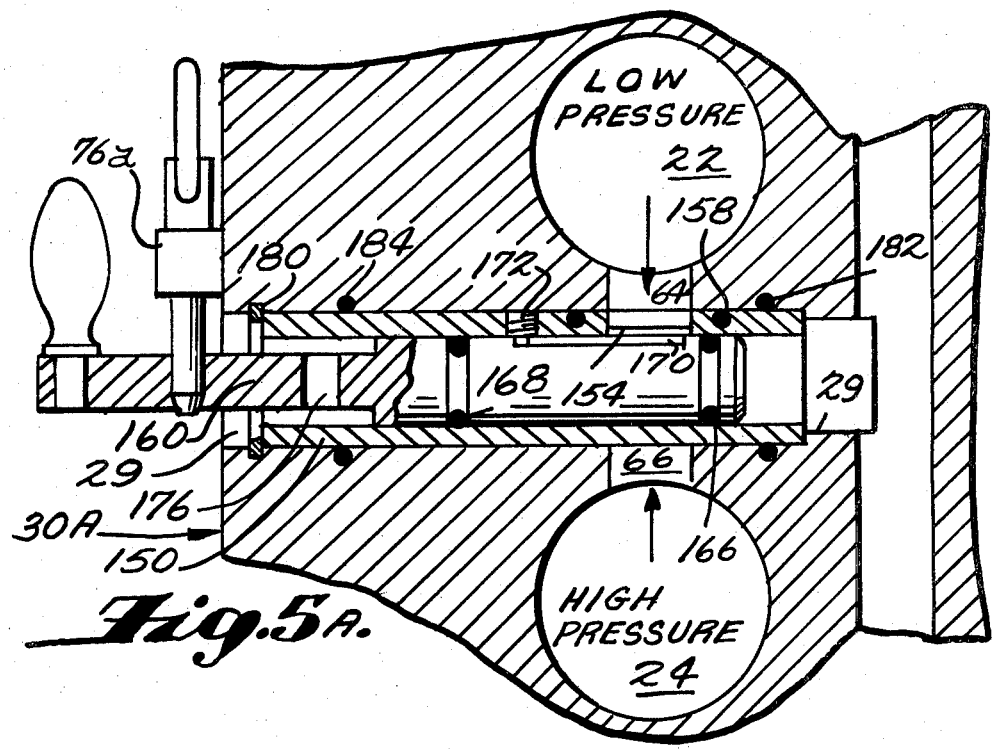
FIGS. 5a, 5b and 5c are cross-sectional views of various states of a second exemplary selector mechanism.

Referring now to FIG. 1, an exemplary embodiment of a valve block in accordance with the present invention is generally designated as 10. Valve block 10 comprises a body block 12 having respective surfaces 12a, 12b, 12c and 12d. A plurality of conventional internal air pilot solenoid operated valves 14, are disposed in a row along surface 12b of the block, communicating with respective ports in the valve block surface as will be explained. Similarly, a further plurality of conventional internal air pilot solenoid operated valves are disposed in a row along the upper surface 12c of body block 12. When valve block 10 is adapted for use with an IS machine, eleven valves are typically disposed on surface 12b and ten valves on surface 12c. Valves 14 and 16 are suitably of the spool or poppet type, although other valve types may be utilized. Orifice sizes of valves 14 and 16 are chosen to provide ample air flow. A plurality of needle valves 18, one associated with each solenoid valve 14 or 16, are disposed in bores along a row in the upper surface 12c of body block 12. A row of bores for receiving either spring or ball check valves 20 are also disposed in surface 12c of body block 12. As will hereinafter be explained, use of a ball check valve 20 provides for rapid actuation and metered exhaust and use of spring check valve 20 provides for metered actuation and rapid exhaust. A low pressure plenum 22, a high pressure plenum 24, a filtered pilot air plenum 25 and respective exhaust plenums 26 and 28 are formed in body block 12. If desired, a single exhaust plenum can be utilized, and further, if desired, coupled to a vacuum source. Plenums 22, 24, 25, 26 and 28 are suitably all formed in body block 12 running parallel to surfaces 12b and 12c and generally perpendicular to the rows of solenoid valves.

Channels are provided between low pressure plenum 22 and high pressure plenum 24 into respective bores 29 in surface 12a adapted for receiving selector mechanisms 30. Bores 29 extend inwardly in a direction generally perpendicular to surface 12a. Each bore 29 communicates with an air passageway 32 formed in body block 12, extending in a direction generally parallel to surface 12a. As will hereinafter be explained, selector mechanisms 30 selectively effect a passage between either the low pressure plenum 22 or high pressure plenum 24 and air passageway 32, or operates to block flow of pressurized air to the passageway.

Each selector mechanism 30 and communicating passageway 32 is associated with a particular solenoid valve 14. Each air passage 32 communicates with a respective second bore 33 extending inwards generally perpendicular from surface 12a of body block 12. Each bore 33 receives a pressure regulator 34. Regulated air from each pressure regulator 34 is provided through an associated air passage 36 to an associated pressure gauge 38 and to the input port 40 of the associated solenoid valve 14.

A respective air passageway 42 is provided, extending generally perpendicularly from surface 12d of body 12 in registry with the output port of each solenoid valve 14. Each passageway 42 communicates through an associated needle valve 18 and spring or ball check valve 20, with a corresponding valve block output port 44.

Respective exhaust passageways 46 are provided in block 12 extending perpendicularly from surface 12b. Each exhaust passageway is disposed in registry with the exhaust port of an associated solenoid valve 14 and communicates with exhaust plenum 28. Filtered pilot air is also provided to each valve 14 through pilot air plenum 25.

An example operation of valve block 10 will now be provided with respect to a given valve 14. In the following description, it should be appreciated that the referenced elements and passageways are those associated with that particular valve 14. As will hereinafter be explained in more detail, selector mechanism 30 provides either high or low pressure air-to-air passageway 32. Air pressure is then brought to a desired level through pressure regulator 34 (as will hereinafter be explained) and applied to the input of solenoid operated valve 14. Solenoid operated valve 14 operates to selectively couple input passageway 40 to output passageway 42 or to couple output passageway 42 to exhaust passageway 46, in accordance with the state of the solenoid. Valve 14 can be either normally open or normally closed. Assuming the given valve 14 to be normally closed, when the solenoid is actuated by the electronic controller (not shown), a passage is effected between input passageway 40 and output passageway 42. Thus, air at the regulated pressure is passed through output passageway 42 to the associated needle valve 18 and ball or spring check valve 20. If a ball check valve 20 is used, air will be passed through needle valve 18 and (rapidly) through ball check valve 20 to the valve block output port 44. If a spring check valve 20 is utilized, the air will be passed to output port 44 at a metered rate through needle valve 18.

When the solenoid is deactivated, communication is established between output passageway 42 and exhaust passageway 46. Accordingly, if a ball check valve 20 is utilized, return of exhaust air from the IS machine element will be passed at a metered rate through needle valve 18 through output passageway 42, and exhaust passageway 46 to exhaust plenum 28. If a spring check is utilized, the majority of the air will be passed rapidly through the spring check 20.

Various elements of the typical IS machine consistently operate at a single, e.g., low pressure. Accordingly, valve block 10 need only be adapted to supply a single air pressure to those particular elements, and the solenoid operated air valves associated with those elements may be directly coupled to one of the pressure sources. Accordingly, the input ports of solenoid operated valves 16, communicate with the low pressure plenum 22 through respective passageways 50. Respective output passageways 52 are also provided in body 12, coupling the output port of the valve 16 with associated needle valves 18 and spring or ball check valves 20 and therethrough to an associated output port 54. Similarly, exhaust passageways 56 communicate between the exhaust port of each valve 16 and exhaust plenum 26. Filtered pilot air is also provided to each valve 16 through plenum 25. The operation of air valves 16 is entirely analogous to the operation of valves 14 except that the output air is provided at a single fixed pressure.

The use of separate low pressure and high pressure plenums in cooperation with selector mechanism 30 and pressure regulator 34 provides for ample air flow over an extremely wide range of operating air pressures. As noted above, selector mechanism 30 selectively couples low pressure plenum 22 or high pressure plenum 24 to the pressure regulator 34, expanding the operating range of pressures available. In addition, selector mechanism 30 also provides for cutting off air flow to the regulator. With reference now to FIGS. 2a, 2b and 2c, the structure and operation of a first example of one selector mechanism 30 will be described. Again, in the following description, it should be appreciated that the referenced elements and passageways are those associated with the particular exemplary selector mechanism.

Selector mechanism 30 comprises a hollow cylinder 60 slidably received in bore 29 in surface 12a of block 12. Bore 29 communicates with both low pressure plenum 22 and high pressure plenum 24 through respective passageways 64 and 66. Passageways 64 and 66 are offset with respect to each other in the axial direction of bore 29. An aperture 68 is provided for selective registry with passageway 66 from high pressure plenum 24.

Cylinder 60 is, in effect, divided into three operative areas, corresponding to the three states or positions assumed. Respective notches 70, 72 and 74 are provided in positions corresponding to the respective desired states. A latching device 76 is included for cooperation with the notches to maintain the cylinder 60 in the desired position when under pressure and to ensure that the pressure from the plenums does not propel cylinder 60 out of block 12. In practice, an automatic mechanism for controlling the state, suitably under the auspices of the glassware forming machine controller would be utilized. For example, cylinder 60 would be adapted to cooperate with a worm screw or lead screw to effect the positioning of the cylinder within bore 62. Similar mechanisms can also be used for manual operation rather than the simple notches and key latch shown in the drawing.

FIG. 2a shows cylinder 60 in a first state whereby aperture 68 is in registry with the passageway 66 from high pressure plenum 24. Accordingly, high pressure air is provided from plenum 24 through aperture 68 and passed through the hollow interior of cylinder 60 to passageway 32. The upper wall of cylinder 60 effectively blocks passageway 64 from low pressure plenum 22. O-rings are suitably provided for sealing. The O-rings may be either disposed on cylinder 60 or incorporated into body block 12, or within appropriate sleeving.

A second state whereby both low and high pressure plenums are blocked by the exterior wall of cylinder 60 is illustrated in FIG. 2b. Again, O-rings are provided for appropriate sealing.

The third state wherein the low pressure plenum 22 is coupled to passageway 32 is shown in FIG. 2c. In this instance, cylinder 60 is withdrawn until notch 74 is in registry with latch 76. High pressure source 24 is blocked off by the wall of cylinder 60. Here again, sealing is provided by appropriately disposed O-rings. Low pressure source 22 thus communicates through passageway 64 and bore 29 with passageway 32.

It should be appreciated that the inclusion of the off state provides a safeguard against spurious operation of solenoid valves. In addition, the off state allows for removal of a single pressure regulator, pressure gauge or air valve without denigrating the pressure characteristics of the entire valve block. In addition, the off state provides an additional safety factor against leakage of various cutoff valves. This safety factor can be particularly important when replacing pressure regulators, pressure gauges or the solenoid valves.

A secondary exemplary selector mechanism 30a will now be described with respect to FIGS. 5a–5d. Selector mechanism 30a comprises a hollow cylinder or sleeve 150 rotatably received in bore 29 in surface 12a of block 12. As in the previously described exemplary selector mechanism 30, bore 29 communicates with low pressure plenum 22 and high pressure plenum 24 through respective passageways 64 and 66. In this example, however, passageways 64 and 66 are aligned with each other in the axial direction of bore 29, but are radially offset about the periphery of the bore, preferably by 180°.

Cylinder 150 is received in bore 29 and adapted for rotational movement therein. A clip 180, suitably a retaining ring, restrains cylinder 150 from axial (longitudinal) movement within bore 29. Respective O-rings 182 and 184 disposed in grooves along the interior surface of bore 29 provide air-tight cooperation between the exterior of cylinder 150 and the interior of bore 29, thus eliminating any air leakage into passageway 32 or to the atmosphere through that juncture.

Cylinder or sleeve 150 is best described with reference to FIG. 5d. Sleeve 150 is hollow, i.e., includes an axial bore 152 running centrally therethrough. An aperture or port 154 (analogous to aperture 68 in selector mechanism 30) is provided for selective registry with one of passageways 64 or 66. Aperture 154 thus selectively provides communication between either low pressure plenum 22 or high pressure plenum 24 (or neither) through axial bore 152 and bore 29 to passageway 32. A groove 156 is machined or otherwise formed on the exterior of cylinder 150 about the periphery of aperture 154. Groove 156 is adapted to receive an O-ring 158, which provides an air-tight seal about aperture 154 between the exterior of cylinder 150 and the interior of bore 29.

It should be noted that since low pressure plenum 22 and high pressure plenum 24 are aligned in the axial direction of bore 29, conventional sealing techniques such as O-rings disposed radially about the periphery of cylinder 150 would not be effective to prevent communication between the two plenums. For this reason, O-ring 158 is disposed in groove 156 circumscribing aperture 154 to effectively seal off aperture 154 from all but the selected plenum, both in the axial and radial directions. O-rings 182 disposed in the interior of bore 29, effectively isolates passageway 32 from the non-selected plenum.

Axial bore 152 of cylinder 150 is adapted to slidably receive a shutoff piston 160. As best shown in FIG. 5d, piston 160 includes radial grooves 162 and 164 about the outside diameter thereof, adapted to receive O-rings 166 and 168, respectively. Piston 160 also includes a slot 170, machined or otherwise formed in axial disposition in the exterior of the piston. Slot 170 is adapted to cooperate with a set screw 172, or other fastener mechanisms, disposed in and cooperating with a hole 174 through the wall of cylinder 150. Set screw 172 and slot 170 cooperate to provide for axial movement of piston 160 within bore 152 of cylinder 150, while at the same time restraining any radial or rotational movement of piston 160 within cylinder 150. Accordingly, torque applied to piston 160 will effect a rotation of cylinder 150 within bore 29 in block 12. Piston 160 also includes respective holes 176 and 178 which cooperate with a latch mechanism 76a (shown in FIGS. 5a–5c) analogous to notches 70, 72 and 74 in selector mechanism 30.

Figure 5C:
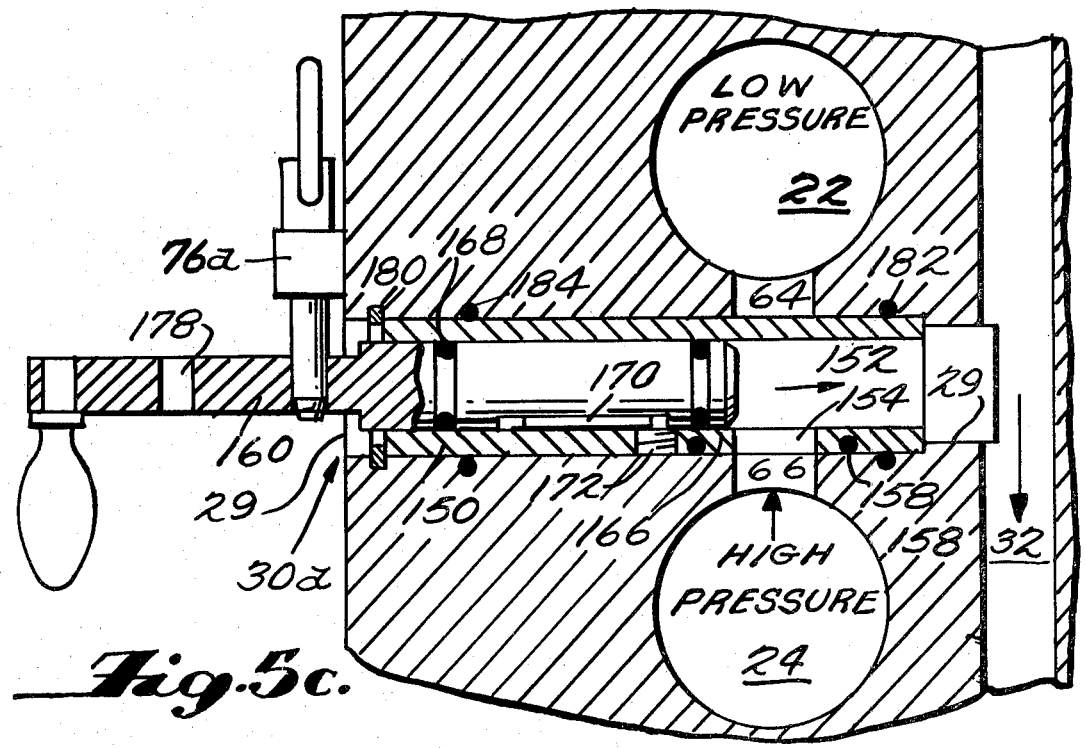
Figure 5B:
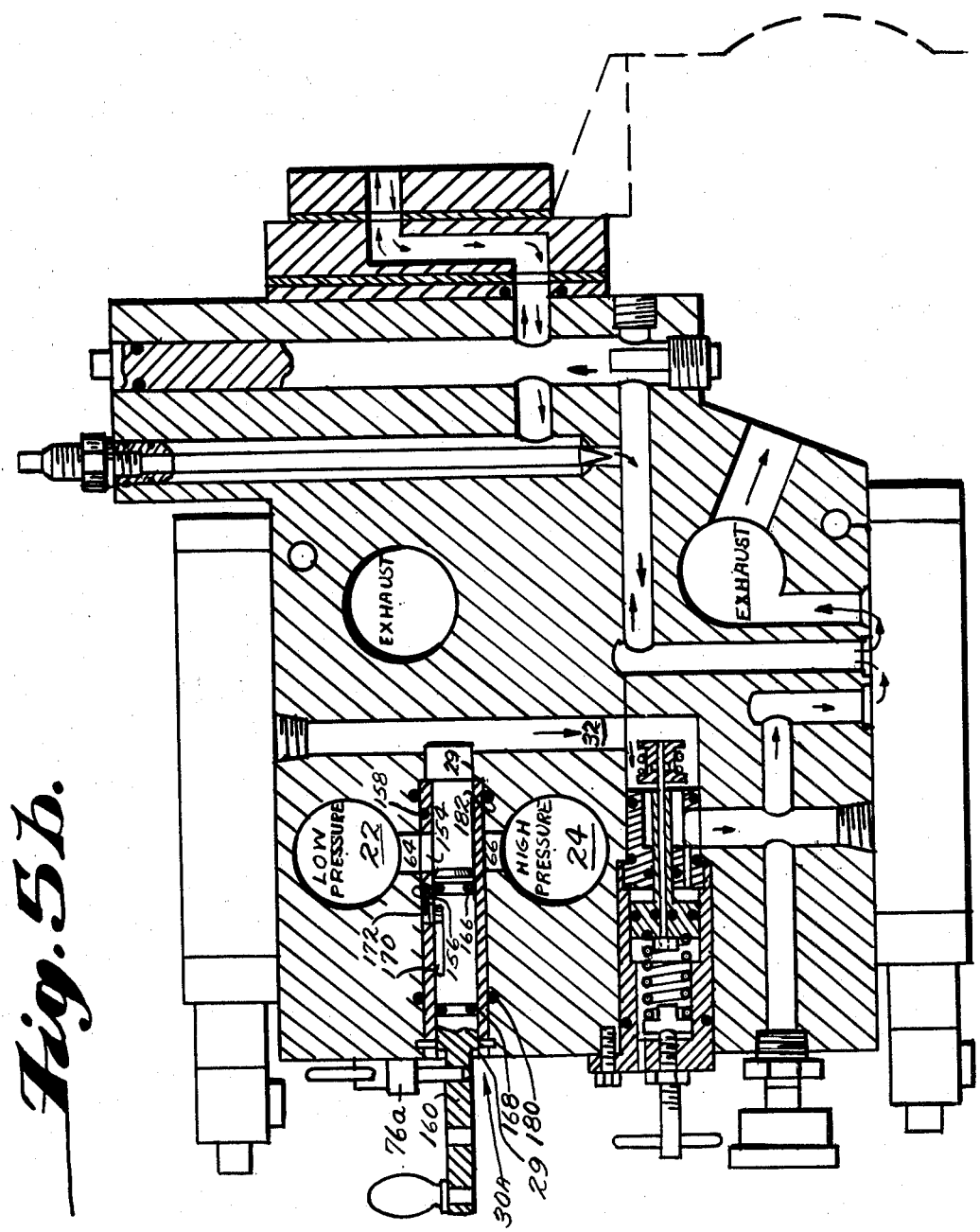

As in the case of the previously described exemplary selector mechanism 30, selector mechanism 30a selectively couples either low pressure plenum 22 or high pressure plenum 24 to passageway 32, or isolates passageway 32 from both plenums. As will hereinafter be more fully described, selection of the respective low (22) or high (24) pressure plenums is effected through rotating cylinder 150 to bring aperture 154 into registry with one or the other of the pressure plenum passageways 64 or 66. Shutoff, i.e., isolation, of passageway 32, is effected through the axial movement of piston 160 within bore 152 of cylinder 150. With reference now to FIGS. 5a–5c, the operation of selector mechanism 30a will be more fully described.

As shown in FIG. 5a, when piston 160 is fully advanced into bore 152 of cylinder 150, passageway 32 is effectively isolated from both low pressure plenum 22 and high pressure plenum 24. The extent of advance into cylinder 150 is defined by a set screw 172 in cooperation with slot 170. O-ring 166 is interposed in bore 152 between the plenums and passageway 32. Assuming aperture 154 to be in registry with one of the passageways 64 and 66, O-ring 158 effectively isolates the selected plenum (low pressure plenum 22 in FIG. 5a) from the non-selected plenum. O-ring 168 prevents leakage of air from the selected plenum into the atmosphere. Similarly, O-rings 182 and 184 prevent leakage from the non-selected plenum into passageway 32 and the atmosphere, respectively.

To provide pressurized air to the passageway 32, piston 160 is withdrawn to the maximum extent permitted by set screw 172 and slot 170. A torque is applied to piston 160 to effect, through the cooperation of set screw 172 and slot 170, rotation of cylinder 150 to bring aperture 154 into registry with the passageway 64 or 66 associated with the selected low pressure plenum 22 (shown in FIG. 5) or high pressure plenum 24 (shown in FIG. 5c). When aperture 154 is in registry with the selected passageway 64 or 66, communication is provided between the plenum and passageway 32 through aperture 154, axial bore 152 and bore 29. O-ring 158 prevents reduction in pressure due to leakage from the selected plenum along the juncture of cylinder 150 and bore 29.

Passageway 32 is isolated from the non-selected plenum by O-rings 158 and 182. O-ring 158 prevents leakage from the non-selected plenum into aperture 154. O-ring 182 prevents leakage from the non-selected plenum through the juncture of cylinder 150 and bore 29.

Leakage into the atmosphere is prevented by O-rings 166, 168 and 184. Leakage from the non-selected plenum is prevented by O-ring 184. Leakage into the atmosphere from the selected plenum through the juncture of piston 160 and bore 152 is prevented by O-rings 166 and 168.

Latching mechanism 76a is suitably a pin which is received in holes 176 or 178 to secure piston 160 in its on or off positions respectively. It should be noted that selector mechanism 30a is particularly advantageous in that retainer clip 180 prevents the selector mechanism from being expelled under pressure from block 12. Similarly, set screw 172 and slot 170 ensure that piston 160 is not expelled from the mechanism when under pressure. Thus, latch mechanism 76a, clip 180 and set screw 172 provide a fail-safe safety mechanism. Latch mechanism 76a, selector mechanism 30 is also particularly suited for mechanization and computer control of the selector mechanism.

Fine adjustment of the selected high or low pressure is provided by pressure regulator 34. The pressure regulator must be of relatively small dimensions to facilitate disposition of a large number of regulated pressure valves in the valve block. It is desirable that a minimum of eight regulated valves be provided to facilitate typical job changes and for fine tuning of the IS machine for maximum production. At the same time, it is necessary that the pressure regulator operate without providing too great a detriment to the air flow and be tolerant of the air contaminants found in unfiltered air.

A preferred embodiment of a pressure regulator 34 having these characteristics is shown in FIG. 3. It should be appreciated that the passageways and elements referenced in the following discussion are those associated with a given regulator 34. Cylindrical bore 33 is provided in body block 12 extending perpendicularly from surface 12a communicating with passageways 32 and 36. Pressure regulator 34 is received in cylindrical bore 33 and secured to body block 12 through suitable fasteners such as bolts. Passageways 32 and 36 are offset relative each other along the axial direction of bore 33. A poppet valve seat 82 is disposed within the cylindrical bore 33. Seat 82 includes an axial cavity 84 communicating with an aperture 86 disposed in registry with air passageway 36. In practice, seat 82 is removably affixed to a sleeve 85 including a flange through which the regulator 34 is secured to body block 12.

Sleeve 85 includes an axial chamber 87 for slidably receiving a piston 88. A small escape aperture is forward of piston 88 and is provided in chamber 87. An adjustable tension spring mechanism 90 is utilized in cooperation with the piston. A spring 92 abuts piston 88 at one end and a screw 94 journalled through sleeve 85 at the other. The screw tensioning mechanism controls the inward pressure of piston 88. Piston 88 includes a stem 96 slidably disposed through a central axial bore in seat 82. Disposed within stem 96 is a shaft 98. Shaft 98 is secured at the piston end with a suitable retainer and has a poppet structure 100 disposed on its other end for cooperation with seat 82. In various circumstances, it may be advantageous to dispose the poppet 100 directly on piston stem 96, omitting the interior shaft 98.

An aspirator 102 is journalled through seat 82 to provide pressure to the piston chamber 87 at the rear of piston 88. Aspirator 102 may be disposed anywhere through the valve seat. However, a tapered end is desirable to create eddy currents to prevent air contamination from clogging the aspirator.

The pressure is controlled by adjusting the tension on spring 92. Piston 88 slides in seat 82, displacing poppet 100 from seat 82. The relative displacement of the poppet 100 and seat 82 is established in an equilibrium position when the pressure provided through aspirator 102 is essentially equal to that provided against the pressure by spring 92. Accordingly, the pressure provided in air passageway 36 is controlled by adjusting spring 92. It should be appreciated that the central cavity of poppet seat 82 and the aperture 86 are both relatively large diameter, approximately equal to the diameter of the air passageways 32 and 36, thus presenting relatively little restriction to flow. Further, the flow of air through regulator 34 is relatively unconvoluted as compared with conventional pressure regulators.

It should also be appreciated that by providing the option of a lower pressure supply, the lower pressures can be attained with less restriction to flow by providing greater displacement of the poppet from seat 82.

The very simplicity of pressure regulator 34 in terms of numbers of parts, is in and of itself, a great advantage with respect to machine maintenance and costs. If for some reason a given pressure regulator fails, a replacement can be effected in a matter of a few minutes by cutting off pressure to the regulator with selector 30, unbolting the bolts securing the faulty regulator to the body block 12, removing the faulty regulator, inserting a replacement and securing the replacement through the two securing bolts.

It should also be appreciated that filtered air is not required for the operation of regulator 34. The air flow through the regulator is relatively open and unconvoluted and is thus not susceptible to clogging. The eddy currents produced by the tapered end of aspirator 102 prevents clogging of the aspirator. Contaminants are not a problem with the generation of the adjusting pressure, since that pressure is provided through spring mechanism 90, and thus does not entail the use of any pressurized air. It should be appreciated that appropriate O-rings are provided for sealing.

Referring again to FIG. 1, as noted above, the respective valves 14 and respective valves 16 communicate with valve block output ports 44 and 54. The output ports 44 and 54 must then be matched with the proper inlet ports of the IS machine manifold kissplate. In the past, the valve blocks have been specially configured for a particular model IS, or tubing is bent to provide the proper matching. Other valve blocks have utilized relatively large blocks of metal with holes bored therethrough at angles to provide proper matching. The tubing and bored block methods, however, both tend to be bulky and are expensive to space consumed, cost to manufacture, and/or installation costs.

In accordance with one aspect of the present invention, a particularly advantageous adapter plate 110 is provided. Adapter plate 110 is shown in FIGS. 1 and 4. Adapter plate 110 has a first surface 110a secured with an intervening gasket 112 to surface 12d of body block 12. A second opposing surface 110b is adapted to be secured, along with an appropriate gasket 114, against the kissplate 116 of the IS machine manifold. The kissplate is coupled to the respective IS machine elements through copper tubing, pipe, or the like (not shown). A plurality of holes 118 are formed through adapter plate 110 at relative positions to provide registry with the kissplate input ports 120. A channel is formed, suitably by milling or casting, in surface 110a of adapter plate 110 running from hole 118 to the desired valve block output port 44. It should be appreciated that similar channels and holes are utilized to provide communication between valve block output ports 54 and kissplate ports 120 as well, but are omitted in FIG. 1 for ease of illustration.

If desired, an intermediate plate 111 can be interposed between gasket 112 and body block surface 12d to facilitate sealing adapter 110 against body block 12. Intermediate plate 111 includes bores therethrough for registry with the respective valve block output ports and communicating with an associated adapter plate channel. Sealing between body block 12 and intermediate plate 111 is provided by resilient sealing means, such as O-rings disposed in grooves circumscribing the bores. Intermediate plate 111 is bolted to adapter 110, with bolts recessed flush in the surface of plate 111, providing sealing pressure against gasket 112. Adapter plate 110 and intermediate plate 111 are pressure fitted in registry with the valve block output ports and kissplate input ports, by bolts (not shown) coupling kissplate 116 to body block surface 12d. Intermediate plate 111 lessens any criticality of having smooth, flat surfaces 110a and 12d.

It should be appreciated that adapter plate 110 can be utilized to adapt valve block 10 to any IS machine kissplate configuration, without requiring varying thicknesses of adapters, expensive forming techniques, or time consuming plumbing. Further, adapter 110 can be readily changed to change solenoid/element assignments, if desired, without requiring the time consuming replumbing from the manifold kissplate to the IS machine elements. Thus, a single standardized valve block output port configuration can be used and, through adapter plate 110, made compatible with any kissplate input port configuration.

Valve block 10 can readily be adapted to provide vacuum to one or more of the various machine functions. In effect, to provide vacuum to a function, the input port of a given solenoid valve 14 is isolated from the pressurized air and the exhaust port of valve 14 is coupled to a vacuum source (pump) rather than to the exhaust manifold. This can be achieved by dedicating a given valve 14 to vacuum operation, and providing appropriate passageways in block 12. Alternatively, an adapter plate as shown in FIGS. 6a and 6b, or an appropriate selector mechanism as shown in FIGS. 7a–7d and 8a–8d, can be used.

In each instance, the needle valve 18, associated with the particular valve 14, is replaced by a suitable strainer or secondary filter 202 (shown in FIG. 6a). A passageway 204 (not shown in FIG. 1) is provided between the bore housing strainer 202 (or needle valve 18), and wall 12d of block 12. To effect an unobstructed passageway, a port is provided in the wall of strainer 202 in registry with passageway 204, and a bore is provided through the plug associated with check valve 20.

Appropriate channeling is provided in adapter plate 110 to match passageway 204 to the appropriate port in the IS kissplate 116. A given solenoid valve 14 selectively provides either positive pressure air, or a vacuum to an IS function. Typically, different functions require the pressurized air and vacuum, and accordingly, the vacuum and pressurized air are provided to different kissplate ports. Needle valve 18, and strainer 202 operate as a selector mechanism, with respect to which output port the valve 14 is to be associated. When valve 14 is adapted for vacuum operation, a passageway is provided through the strainer and passageway 204, while the associated passageway 44, originally used with needle valve 18, is sealed or shut off by the exterior wall of strainer 202. Similarly, although not shown in FIG. 1, passageway 204 is shut off or sealed by needle valve 18 when the associated valve 14 is to be used to provide positive pressure air.

Alternatively, a sleeve or plug (not shown) associated with check valve 20, or with needle valve 18 and strainer 202, can be utilized to select the appropriate passageway. The sleeve would include respective ports disposed for registry with passageways 202 and 44 respectively, but offset in radial angle (e.g., 90°) from each other. O-rings or the like would be disposed on either side of the passageway about the periphery of the sleeve to provide sealing, and to effectively isolate passageways 204 and 44. The appropriate passageways 44 or 204 would be chosen by rotating the sleeve. Thus, through relatively simple mechanisms, the output port with which the solenoid operated valve 14 is associated can be changed to provide air to one IS function and vacuum to a second IS function without requiring plumbing changes to the IS machine.

As noted above, valve 14 can be converted from positive pressure operation to a vacuum mode operation by an adapter plate 200. Adapter plate 200 is interposed between solenoid operated valve 14 and surface 12b of block 12 to effect the coupling necessary to provide vacuum. Adapter plate 200 effectively isolates the input port of valve 14 from passageway 36 of the valve block. To this end, an O-ring is disposed about the periphery of passageway 40 (circumscribing passageway 40) in a groove formed in surface 12b of block 12. Passageways 206 and 207 are provided through adapter plate 200 to couple passageway 42 to the output port of valve 14 and to supply pilot air to valve 14, respectively. Adapter plate 200 also effectively seals passageway 42 from the exhaust plenum 28. O-rings are disposed in a groove circumscribing passageways 40, 42 and 46 to provide sealing. A passageway 208 in adapter plate 200 provides one port in registry with the exhaust port of valve block 14 and another port in the surface of adapter plate 200 corresponding to the surface 12d of block 12, adapted for coupling to a line from a vacuum source (pump). The line from the vacuum pump to passageway 208 is suitably a flexible hose and/or hard plumbed pipe (not shown). Alternatively, the second port of passageway 208 can be disposed in registry with a corresponding port in surface 12b of block 12 which communicates with an internal vacuum passageway or plenum disposed between pilot air plenum 25 and exhaust plenum 28 such as shown in FIG. 6b.

In operation, when the solenoid valve is in the position corresponding to exhaust in the positive air mode, communication between the output port of valve 14 and the vacuum pump is provided via passageway 208. A vacuum is thus supplied to the IS function through passageway 42, strainer 202, passageway 204, and the porting of adapter plate 110.

Secondary strainer 202, not only operates as an output port selecting mechanism, but also protects against damage to valve 14 by glass particles and the like drawn into the valve block by the vacuum in spite of external filtering apparatus typically used with the IS machine. Strainer 202 is readily accessible to facilitate periodic cleaning and/or replacement.

Adapter plate 200 is particularly advantageous in that it is extremely inexpensive and simple. However, installation of adapter plate 200 to convert a given solenoid operated valve 14 to provide vacuum, involves removal of valve 14 from valve block 12, positioning adapter plate 200, resecuring valve 14 and adapter plate 200 to block 12, and coupling the vacuum line to adapter plate 200 (unless the vacuum line is disposed within valve block 12). An alternative apparatus for selectively adapting a given solenoid valve 14 to either positive air or vacuum mode operation, without requiring removal of valve 14 is shown in FIGS. 7a–7d and 8a–8d.

Referring now to FIG. 7a, a selector mechanism 250 for controllably adapting an associated solenoid operated valve 14 for positive air or vacuum mode operation, is shown. As noted above, selector mechanism 250 would be used in connection with strainer 202 and passageway 204. A bore 252 is provided in valve block 12 inwardly from surface 12a. Bore 252 suitably runs parallel to surface 12b, and communicates with passageways 40, 42 and 46. The innermost end of bore 252 communicates with a second bore 254 opening outward at surface 12d of block 12. Second bore 254 is adapted to receive an external line (flexible hose or hard plumbed) from the vacuum pump (not shown). Alternatively, the innermost end of bore 252 can be made to communicate with a vacuum plenum (not shown) internal to valve block 12. Selector mechanism 250 is rotatably received in bore 252 and cooperates with a retainer 255 suitably bolted or otherwise fastened to surface 12a of block 12.

Selector mechanism 250 comprises a rotatable sleeve 256 and a piston 258 rotatably and slidably disposed within sleeve 256. Sleeve 256 suitably extends from bore 252 beyond surface 12a of body block 12. A groove is provided about a portion (e.g., 90°) of the outer wall of sleeve 256 for cooperation with a leg portion of retainer 255 to rotatably secure sleeve 256 in bore 252. Wrench-flats are suitably provided on the extending portion of sleeve 256 to facilitate rotation of the sleeve.

Sleeve 256 includes appropriate porting to provide the necessary communication between passageways 40, 42 and 46 and solenoid operated valve 14 for positive air mode operation. Three sets of two ports 260a–260b, 262a–262b, 264a–264b are provided in sleeve 256. The ports of each set are disposed in axial alignment but are radially offset at 180° with respect to each other. Ports 260a–260b, 262a–262b and 264a–264b are disposed in axial alignment with passageways 40, 42 and 46, respectively. Sets of ports 260a–260b, 262a–262b and 264a–264b are illustrated in sectional view in FIGS. 7b, 7c, 7d, 8b, 8c and 8d.

Sleeve 256 also includes the necessary porting for effecting vacuum operation. A set of ports 266a–266b are disposed in axial alignment with passageway 42 (and ports 262a–262b) but are 90° radially offset from ports 262a–262b. Ports 262a–262b and 266a–266b are best seen in FIGS. 7c and 8c. To provide appropriate sealing of passageways 40 and 46 for vacuum mode operation, O-rings or the like 268 and 270 are disposed in grooves in the exterior surface of sleeve 256. O-rings 268 and 270 are disposed having centers in axial alignment with passageways 40 and 46 and are in radial alignment with each other but are radially offset from ports 260a–260b and 264a–264b by, e.g., 90°. A port 272 is provided in axial alignment with passageway 46 but radially offset from O-ring 270 by 180°.

Further sealing is effected through appropriately disposed O-rings or the like. O-rings 274, 276, 278 and 280 are disposed in grooves about the outer wall of sleeve 256. O-ring 274 prevents leakage from passageway 40 to the atmosphere through the juncture of sleeve 256 and bore 252. O-rings 276 and 278 effectively isolate passageways 40, 42 and 46 from each other. O-ring 280 prevents leakage from passageway 46 to the atmosphere or into the vacuum source through the juncture of sleeve 256 and bore 252.

Piston 258 cooperates with sleeve 256 to selectively provide the appropriate passageways for either positive air or vacuum operation. Piston 258 includes three spaced radial bores 282, 284 and 286. Bores 282, 284 and 286 are disposed for registry with ports 260a–260b, 262a–262b and 264a–264b, respectively, when piston 258 is fully received in sleeve 256. Sealing is provided by appropriate O-rings disposed about the outer wall of piston 258 on either side of bores 282, 284 and 286 and the side wall port of passageway 288.

A further passageway 288 is formed in piston 258 having a port in the side wall of piston 258 spaced apart from bore 286 by a distance corresponding to the distance between the output and exhaust ports of valve 14, and a second port at the innermost end of piston 258 (and thus communicating with bore 254 through bore 252).

Positive air mode operation is provided by rotating sleeve 256 to bring ports 260a–260b, 262a–262b, and 264a–264b into registry with passageway 40, 42 and 46, respectively, and fully engaging piston 258 in sleeve 256 to bring bores 282, 284 and 286 into registry with ports 260a–260b, 262a–262b and 264a–264b respectively. Thus, passageway 40 communicates with the input port of solenoid operated valve 14 (through ports 260a–260b and bore 282), passageway 42 communicates with the output port of solenoid operated valve 14 (through ports 262a–262b and bore 284), and passageway 46 communicates with the exhaust port of solenoid operated valve 14 (through ports 264a–264b and bore 286). The side wall of port of passageway 288 is out of registry with any port in sleeve 256. Thus, in view of the sealing O-rings, the vacuum pump is thus isolated from the operating passageways.

To provide vacuum mode operation, sleeve 256 is rotated by, e.g., 90°, to bring sealing O-rings 268 and 270 into registry with passageways 40 and 46, ports 266a–266b into registry with passageway 42 and sleeve port 272 into registry with the exhaust port of valve 14. Piston 258 is then partially withdrawn from sleeve 256 to bring bore 286 into registry with ports 266a–266b and the side wall port of passageway 288 into registry with sleeve port 272. Thus, passageways 40 and 46 are sealed, passageway 42 communicates through ports 266a–266b and bore 286 with the output port of valve 14 and the exhaust port of valve 14 communicates with the vacuum source through port 272, passageway 288 and bore 254.

The axial position of piston 258 corresponding to registry of the bores with the appropriate ports of sleeve 256 is facilitated by use of a securing pull-pin 290 extending from retainer 255 through one of two ports 292 and 294 in sleeve 256 corresponding to the two radial positions of the sleeve, and two receiving bores in piston 258 at axial positions corresponding to the positions of registry.

The above description assumes that sleeve 256 is rotated both with respect to block 12 and piston 258. It should be appreciated that piston 258 may be adapted to rotate with sleeve 252. In such an instance, a crossbore axially aligned but radially offset by 90° with bore 286 would be provided, and the side wall port of passageway 288 would be rotated by 90° from the embodiment shown in the drawings.

Selector mechanism 250 provides for ready conversion of a given solenoid operated valve 14 from positive air mode operation to vacuum mode operation and visa versa. The conversion can be effected merely by interchanging needle valve 18 and strainer 202 rotating sleeve 256 and inserting or withdrawing plunger 258.

It should be appreciated that the use of either adapter plate 200 or selector mechanism 250 in conjunction with valve 14 to provide direct electronic control of the vacuum at the situs of the valve block rather than at the bed level of the IS machine, provides for substantially instantaneous and constant vacuum assist operation. Not only are the second tier of valves eliminated as compared to the prior art apparatus, but also the delays and inconsistent operation associated with the long length of plumbing intervening between the control valve and the IS function is eliminated. Further, valve failure is made far less likely by removal of the valves from the bed level to the valve block and through use of secondary filter or strainer 202.

It should be appreciated from the foregoing that the present invention provides a particularly advantageous electronic valve block. The valve block is compact yet can provide ample flow of output air over a wide range of pressures, and is tolerant of air contaminants. In addition, the configuration of the valve block is such that the respective valves and pressure regulators in the block can be removed for service without necessitating dismantling or removal of the entire valve block. Further, the valve block is made compatible with any IS machine manifold configuration through the use of an inexpensive and compact adapter plate.

In addition, the individual solenoid operated valves can readily be adapted to provide either positive pressure air to an IS function or to provide a vacuum assist to the same or a different IS function. The conversion from positive air operation to vacuum or visa versa is accomplished without requiring replumbing of the IS machine and with a minimum of machine downtime.

It will be understood that the above description is of illustrative embodiments of the present invention and the invention is not limited to the specific form shown. For example, while the valve block is described in the context of a glassware forming machine, it may readily be adapted for use with any electronically controlled, hydraulically operated apparatus. Similarly, it may be desirable to locate all of the pressure gauges 38 in a remote bank. Also the valve block in accordance with the present invention, can be readily converted by those skilled in the art to accommodate various types of solenoid operated valves, including single valves which control more than one fluid path to, for example, control a plurality of IS functions. These and other modifications may be made in the design and arrangement of the elements without departing from the spirit of the invention as expressed in the appended claims.

What is claimed is:

1. A valve block for an IS glassware forming machine, adapted for cooperation with at least one valve means for selectively effecting fluid communication between a first port and a second port thereof, and for selectively effecting fluid communication between said second port and a third port thereof, said valve block comprising:
    a body;
    first, and second plenums formed in said body, said first and second plenums being respectively coupled to fluid supplies at differing pressures;
    a first fluid passageway formed in said body, communicating with said valve means first port;
    an output passageway, formed in said body, communicating with said valve means second port, said output passageway being adapted for connection to said IS glassware forming machine;
    an exhaust means for exhausting said fluid, communicating with said valve means third port; and
    selector means, disposed in said valve means for selectively coupling said first or second plenums to said first fluid passageway.

2. The valve block of claim 1 further including:
    at least one further valve means secured to said body;
    a further output passageway formed in said body and communicating with said further valve means second port, said further output passageway being adapted for connection to said glassware forming machine;
    and
    means for coupling one of said first or second ports of said valve to a vacuum source and for sealing the other of said valve ports.

3. The valve block of claim 2 wherein said further output passageway is adapted for selective connection to a plurality of respective elements of said IS glassware forming machine; and
    said valve block further includes means, for selectively coupling said further output passageway to one of said respective elements.

4. The valve block of claim 2 wherein said output passageway includes a first portion communicating with said further valve means second port and a plurality of output portions, each adapted for connection to a respective element of said IS glassware forming machine and communicating with said first portion in a common chamber in said body; and
    means, disposed in said common chamber, for selectively coupling said first portion to one of said output portions.

5. The valve block of claim 4 wherein said common chamber comprises a further bore extending from an external surface of said body; and
    said means for selectively coupling said first portion to one of said output portions comprises one of a needle valve and a filter;
    said needle valve, being removably received in said bore to the exclusion of said filter and including a side surface to seal all but a first selected one of said output portions; and
    said filter, being removably received in said bore to the exclusion of said needle valve, and including side walls to seal all but a second selected one of said output portions.

6. The valve block of claim 4 wherein said common chamber comprises a further bore extending from an external surface of said body and said means for selectively coupling said first portion to one of said output portions comprises a needle valve;
    said needle valve being removably received in said bore and including a side surface to seal all but a first selected one of said output portions.

7. The valve block of claim 4 wherein said common chamber comprises a further bore extending from an external surface of said body; and
    said means for selectively coupling said first portion to one of said output portions comprises a filter;
    said filter being removably received in said bore and including side walls to seal all but a selected one of said output portions.

8. The valve block of claim 1 further including:
    a vacuum plenum formed in said body;
    a further valve means secured to said body for selectively effecting fluid communication between a further valve first port and a further valve second port;
    and a further output passageway, formed in said body, communicating with said further valve second port, said further output passageway being adapted for connection to said IS glassware forming machine; and means for effecting communication between said further valve first port and said vacuum plenum.

9. The valve block of claims 2, 8 or 3 wherein said valve block further comprises a filter removably disposed in said further output passageway.

10. The valve block of claim 1 further comprising means for adapting at least one valve means to selectively provide vacuum at the second port thereof, said means for adapting including:

an adapter plate interposed between said first, output and exhaust passageways and said valve means, said adapter plate including a first adapter passageway communicating between said output passageway and said valve means second port, a surface blocking said first and exhaust passageways, and a second adapter passageway adapted for communication between a vacuum source and one of said valve first and third ports; and respective resilient sealing members disposed between said first output and exhaust passageways and said adapter plate circumscribing said first output and exhaust passageways and further respective resilient sealing members disposed between said adapter plate and said valve means, circumscribing said valve means second port and said one of said valve means first port and valve means third port.

11. The valve block of claim 10 wherein said output passageway includes:

a first portion communicating with said valve means second port; and second and third portions communicating with said first portion and adapted for connections to respective machine elements of said IS glassware forming machine; and means for selectively sealing one of said second and third output passageway portions.

12. The valve block of claim 11 wherein said means for selectively sealing comprises:

a bore extending from an external surface of said body and communicating with said first, second and third portions of said output passageway;

one of a filter, and a needle valve;

said needle valve being removably received in said bore to the exclusion of said filter, and having a sleeve conforming to said bore and extending to seal said third output passageway portion; and said filter being removably received in said bore to the exclusion of said needle valve, and including a sleeve conforming to said bore and extending to seal said second output passageway portion.

13. The valve block of claim 10 further including:

a filter, removably disposed in said output passageway.

14. A pneumatic valve block for selectively effecting operation of respective machine elements, comprising:

a body;

a first plenum, formed in said body, and adapted for cooperation with a source of fluid at a first pressure;

a second plenum, formed in said body and adapted for cooperation with a source of fluid at a second pressure;

an exhaust plenum, formed in said body, and adapted for providing an exhaust from said valve block;

at least one first fluid passageway formed in said body and communicating with an associated first port in a first external surface of said body;

at least one second fluid passageway formed in said body, communicating between an associated second port in said body first external surface and at least one associated valve block output port adapted for connection to a respective machine element;

at least one third fluid passageway, formed in said body, communicating between an associated third port in said body first external surface and said exhaust plenum;

at least one valve means, removably secured to said body first external surface, for selectively effecting fluid communication between said associated first port and said associated second port and for selectively effecting fluid communication between said associated second port and said associated third port;

at least one bore, formed in said body, extending from an external surface of said body and communicating with an associated first fluid passageway;

at least one fourth fluid passageway communicating between said first plenum and said bore;

at least one fifth fluid passageway communicating between said second plenum and said bore; and selector means, received in said bore, for selectively effecting a passage between said first plenum and said first passageway and selectively effecting a passage between said second plenum and said first passageway.

15. The valve block of claim 14 wherein said fourth fluid passageway and fifth fluid passageway are offset with respect to each other in the axial direction of said bore;

said selector means comprises a member slidably received in said bore, said member having outer walls conforming to said bore, said member including a member passageway formed therein communicating between the interior end of said member and an orifice in the wall of said member, said orifice being disposed for selective registry with said fifth passageway, whereby the relative axial position of said member in said bore, controllably effects one of at least two states;

one state being such that said orifice is in registry with said fifth passageway to provide a fluid path from said second plenum through said orifice and member passageway to said first fluid passageway; said fourth passageway is sealed by said member outer wall; and a second state being such that a fluid passageway is provided between said first plenum through said fourth passageway and said bore to said first passageway.

16. The valve block of claim 15 wherein said member further comprises means for sealing both said fourth and fifth passageways from said bore.

17. The valve block of claim 14 further including at least one second bore formed in said body extending from an external surface of said body and communicating with an associated first fluid passageway; and pressure regulator means, removably received in said bore, for regulating the pressure in said first passageway.

18. The valve block of claim 17 wherein said first passageway includes first and second legs, said first and second legs being offset with respect to each other in the axial direction of said second bore, and said pressure regulator comprises:
  a sleeve, adapted for securing to said body, having a central hollow chamber therein;
  a seat coupled to said sleeve, and having an axial cavity formed therein, and an aperture communicating with said axial cavity, and extending through one wall thereof, said seat being adapted for reception in said second bore with said axial cavity opening toward said first leg of said first fluid passageway, and said aperture in registry with said first fluid passageway second leg;
  a piston slidably disposed within said sleeve central chamber, said piston having an associated stem affixed thereto slidably journalled through said seat;
  a poppet structure coupled to said piston stem, and adapted for cooperation with said seat axial cavity;
  aspirator means extending through said seat for providing fluid communication between said seat axial cavity; and
  spring loaded tensioning means disposed in said central cavity abutting against said piston on the side opposite from said seat for adjustably providing a pressure against said piston to effect a displacement of said poppet from said seat.

19. The valve block of claim 14 wherein said fourth fluid passageway and fifth fluid passageway are aligned with each other in the axial direction of said bore and radially offset from each other, and said selector means comprises:
  a member, rotatably secured in said bore, said member having outer walls conforming to said bore;
  said member including a member passageway formed therein between a first member port in the outer wall of said member disposed for selective registry with one or the other of said fourth or fifth passageways in accordance with the radial position of said port and a second member port communicating with said first passageway;
  registry of said first member port with a selected one of said fourth or fifth passageways controllably effecting fluid communication between said selected one of said fourth or fifth passageways and said first passageway through the interior of said member;
  said member further including a groove formed on the exterior of said member circumscribing said first member port; and
  said groove being adapted to receive a resilient sealing member.

20. The valve block of claim 19 wherein said selector means further comprises means for selectively sealing said orifice to effectively isolate said first passageway from both said fourth and fifth passageways.

21. The valve block of claim 19 wherein:
  said member comprises a hollow sleeve and said selector means further comprises a piston slidably disposed in said sleeve for selectively blocking said first member port.

22. The valve block of claim 2 wherein said piston includes a slot formed in the exterior surface thereof, and said sleeve includes an inwardly extending member, received in said slot, to define the extent of axial motion of said piston in said sleeve and to restrain rotation of said piston in said sleeve.

23. The valve block of claims 19, 20 or 22, wherein said selector mechanism further includes means to restrain axial movement of said member in said bore.

24. The valve block of claims 19, 20, 21 or 22 further including at least one second bore formed in said body extending from an external surface of said body and communicating with an associated first fluid passageway; and
  pressure regulator means, removably received in said bore, for regulating the pressure in said first passageway.

25. The valve block of claim 24 wherein said first passageway includes first and second legs, said first and second legs being offset with respect to each other in the axial direction of said second bore, and said pressure regulator comprises:
  a regulator sleeve, adapted for securing to said body, having a central hollow chamber therein;
  a seat coupled to said regulator sleeve, and having an axial cavity formed therein, and an aperture communicating with said axial cavity, and extending through one wall thereof, said seat being adapted for reception in said second bore with said axial cavity opening toward said first leg of said first fluid passageway, and said aperture in registry with said first fluid passageway second leg;
  a piston slidably disposed within said regulator sleeve central chamber, said piston having an associated stem affixed thereto slidably journalled through said seat;
  a poppet structure coupled to said piston stem, and adapted for cooperation with said seat axial cavity;
  aspirator means extending through said seat for providing fluid communication between said seat axial cavity; and
  spring loaded tensioning means disposed in said central cavity abutting against said piston on the side opposite from said seat for adjustably providing a pressure against said piston to effect a displacement of said poppet from said seat.

26. The valve block of claim 14 wherein said valve means includes first, second and third valve ports, corresponding to said first, second and third ports in said associated first external surface of said body, and said valve block further comprises means for selectively providing a vacuum to said respective machine element, said means for selectively providing a vacuum including:
  an adapter plate, interposed between said valve means and said body first external surface;
  said adapter plate including a first adapter passageway communicating between said associated second port and said second valve port, a surface blocking said associated first and third ports;
  a second adapter passageway adapted for communicating between a vacuum source and one of said valve first port and valve third port; and
  respective resilient sealing members disposed between said adapter plate and said first external surface circumscribing each of said associated first, second and third ports; and
  further respective resilient sealing members disposed between said adapter plate and said valve means circumscribing said valve second port and said one of said valve first port and valve third port.

27. The valve block of claim 26 wherein said second fluid passageway includes:
- a first portion extending from said associated second port;
- a further bore, extending from an external surface of said body, and communicating with said first portion;
- second and third portions, communicating between said bore and respective associated valve block output ports adapted for connection to respective machine elements; and
- means, received in said further bore, for selectively coupling said first portion to one of said second and third portions.

28. The valve block of claim 27 wherein said means for selectively coupling said first portion to one of said second or third portions comprises:
- one of a needle valve and a strainer;
- said needle valve being removably received in said bore to the exclusion of said strainer and including means for sealing one of said second and third portions; and
- said strainer being removably received in said further bore to the exclusion of said needle valve and including means for sealing the other of said second and third portions.

29. The valve block of claim 26 further including a filter, removably disposed in said second fluid passageway.

30. A pneumatic valve block for selectively effecting operation of respective machine elements, comprising:
- a body;
- a first plenum, formed in said body, and adapted for cooperation with a source of fluid at a first pressure;
- an exhaust plenum, formed in said body, and adapted for providing an exhaust from said valve block;
- at least one first fluid passageway formed in said body and communicating with an associated first port in a first external surface of said body;
- at least one second fluid passageway formed in said body, communicating between an associated second port in said body first external surface and an associated valve block output port adapted for connection to a respective machine element;
- at least one third fluid passageway, formed in said body, communicating between an associated third port in said body first external surface and said exhaust plenum;
- at least one valve means, removably secured to said body first external surface, for selectively effecting fluid communication between said associated first port and said associated second port and for selectively effecting fluid communication between said associated second port and said associated third port;
- at least one bore, formed in said body, extending from an external surface of said body and communicating with an associated first fluid passageway; and
- pressure regulator means removably received in said bore, for controlling the pressure in said first passageway.

31. The valve block of claim 30 wherein said first passageway includes first and second legs, said first and second legs being offset with respect to each other in the axial direction of said second bore and said pressure regulator comprises:
- a sleeve, adapted for securing to said body, having a central hollow chamber therein:
- a seat coupled to said sleeve, and having an axial cavity formed therein, and an aperture communicating with said axial cavity, and extending through one wall thereof, said seat being adapted for reception in said second bore with said axial cavity opening toward said first leg of said first fluid pasageway, and said aperture in registry with said first fluid passageway second leg;
- a piston slidably disposed within said sleeve central chamber, said piston having an associated stem affixed thereto slidably journalled through said seat;
- a poppet structure coupled to said piston stem, and adapted for cooperation with said seat axial cavity;
- aspirator means extending through said seat for providing fluid communication between said seat axial cavity; and
- spring loaded tensioning means disposed in said central cavity abutting against said piston on the side opposite from said seat for adjustably providing a pressure against said piston to effect a displacement of said poppet from said seat.

32. The valve blocks of claims 1, 14, 15, 16, 17, 18 or 30 wherein said valve means comprises a solenoid operated valve.

* * * * *